Patented July 2, 1946

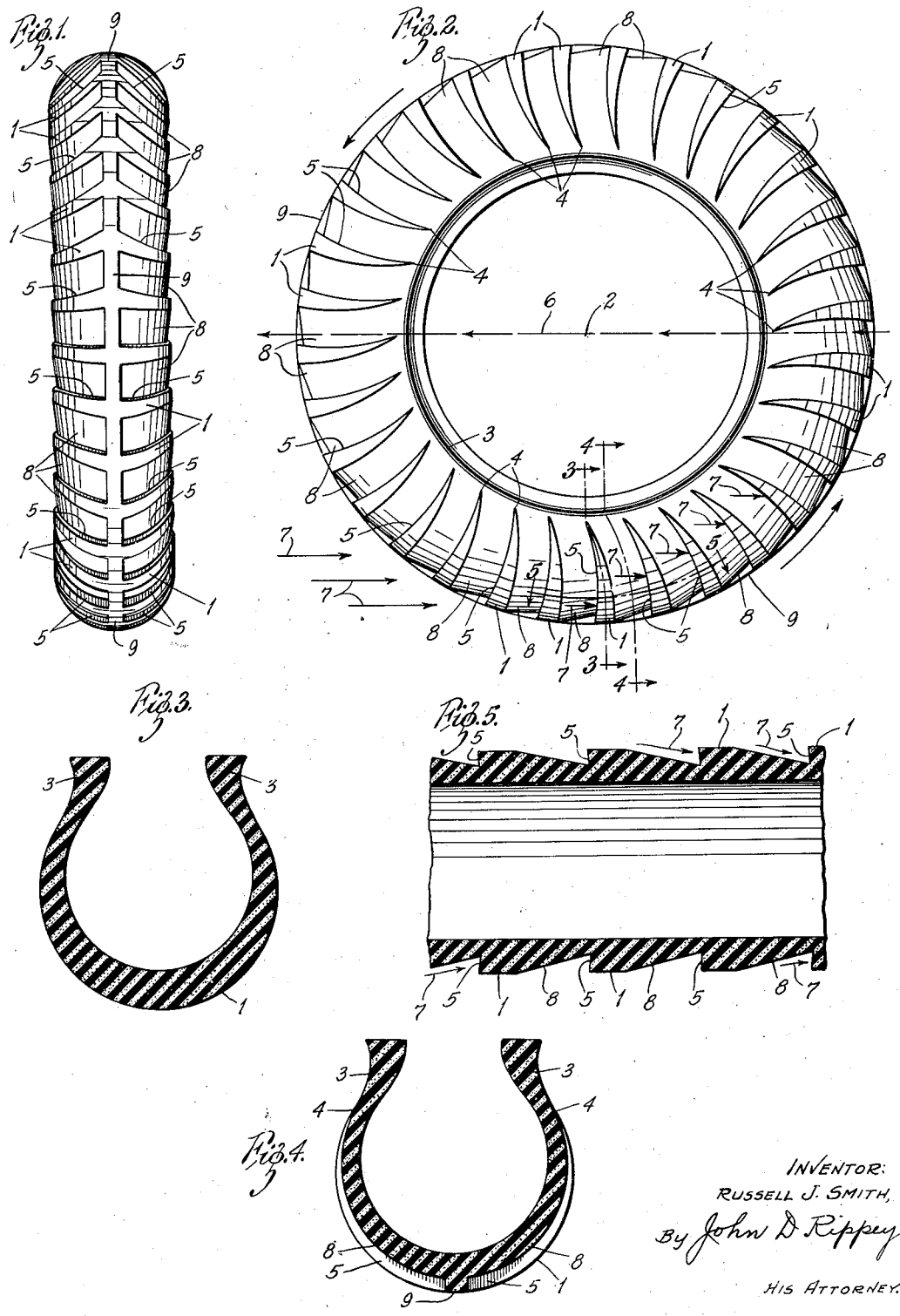

2,403,309

UNITED STATES PATENT OFFICE 2,403,309

TIRE FOR AIRPLANE WHEELS

Russell J. Smith, Richmond Heights, Mo.

Application November 14, 1942, Serial No. 465,624

4 Claims. (Cl. 244—103)

This invention relates to a tire for airplane wheels; and has special reference to a tire having a tread formation designed to provide impingement for the air to initiate and maintain rotary movement of the tire before landing and also to serve as a braking and supporting tread for the airplane after landing.

It is recognized that tires which constitute part of the landing gear for airplanes must (1) function as supporting bearings between the plane and the surface of the landing field or ground; and (2) also provide traction surfaces for braking power to reduce the momentum of the plane while taxiing after landing. Airplane wheels and tires do not ordinarily function as impelling or driving traction wheels for propelling the airplane along the ground or field. By contrast, automobile tires and similar tires on vehicles of that type must also attain an additional or third function; which is to say, automobile and similar tires must additionally function to provide driving traction for rotating the wheels along the surface of the road or ground and thereby propel the automobile or other vehicle. To attain this additional or third function, the treads of automobile tires and the like are designed to provide positive grip for both driving power and for braking power. For this additional or third function, the tires for automobiles or the like are usually provided with multiple duplicate forward and rearward gripping or driving surfaces that are angular to the outer peripheries, and sometimes in the planes of the radii of the tires, thereby forming more or less sharply defined depressions immediately in front of and to the rear of these surfaces in the finished tire. Automobile tread designs having these general features or formations are numerous. Most or all of them have the uniform characteristic of providing a two-way gripping or traction feature, to afford gripping or traction driving engagement with the surface of the road when driven in either direction.

Airplane tires do not need to provide driving traction, as automobile tires must provide, but must or should provide braking traction. Because it is wholly unnecessary to provide driving traction on the treads of airplane tires, it is possible to eliminate the duplicate forward and rearward gripping or driving surfaces angular to their outer peripheries to afford driving traction when the airplane is moving in any direction on a landing field. The novel structural features characterizing the present invention are multiple circumferential flat tread surfaces having rear walls inclined to intersection with radial walls provided for impingement of the air to initiate rotation of the tires before landing. This novel structure also has the final effect that, when the tire are mounted on the airplane wheels, the circumferential braking tread surfaces perform their functions when on the ground while the impingement surfaces for the air on the tread portions and side walls of the tires are presented only on that forward portion of the respective tires which are below the planes of the horizontal diameter thereof, the remaining upper portions of the tires presenting to the air stream only receding inclined surfaces on the tread portions and side walls. This structure results in rotation of the tires of the airplane in the same direction as when the airplane is taxiing along the surface of the ground or landing field.

An object of the present invention is to provide a tire for an airplane wheel having a novel bearing tread surface with abrupt walls for impingement of the air to initiate and maintain rotation of the wheel at a speed approaching the same as the speed of rotation required to support the plane immediately after landing, thereby reducing waste of the tire material and damage to the structure of the tire now resulting from sliding contact of unrotated tires with the landing surface or ground during high speed forward movement of the airplane when landing.

Another object of the invention is to provide an improved airplane tire having a tread or bearing surface including essentially a circumferential series of abrupt walls both on the periphery and sides of the tire intersecting a circumferential series of relatively flat and wide bearing surfaces having rear walls inclining inwardly relative to the body of the tire to intersection with adjacent ones of said abrupt walls, so that only those abrupt walls which are below the plane of the horizontal diameter of the tire receive the impact of the air during forward travel of the airplane before landing, while said inclined walls at the upper portion of the tire povides surfaces over and along which such air as is permitted to contact therewith may flow or move freely without substantially retarding rotation of the tire.

Other objects and advantages of the invention will be apparent from the following description, reference being made to the annexed drawing, in which—

Fig. 1 is a front elevation of my improved tire for an airplane wheel.

Fig. 2 is a side elevation of the tire.

Fig. 3 is an enlarged sectional view on the line 3—3 of Fig. 2.

Fig. 4 is a sectional view on the line 4—4 of Fig. 2.

Fig. 5 is a sectional view on the curved line 5—5 of Fig. 2.

As shown in the drawing, the invention is embodied in the tire casing, and has no relation to the inner tube nor to the landing gear. The tire may be used on conventional airplane wheels of different types, and may be made of rubber or rubber and canvas or appropriate substitutes therefor.

The tire casing in which the invention is embodied is molded to form a continuous annular body having a circumferential series of circumferentially spaced tread or bearing surfaces 1. The tread or bearing surfaces 1 are in the same annular plane around the axis 2 of the casing, are relatively wide in a circumferential direction at their adjacent ends near the periphery of the casing, and are tapered or narrowed toward their opposite ends. These tread or bearing surfaces 1 engage the surface of the landing field or ground so that the tires on the airplane wheels will function as supporting bearings between the plane and the surface of the landing field or ground, and will also provide traction surfaces for braking power to reduce the momentum of the plane while the plane is taxiing after landing.

The tread or bearing surfaces 1 are extended and continued along both sides of the casing approximately to the edges or beads 3. Said surfaces are preferably spaced equally about the periphery of the tire so that the edges of the respective surfaces converge toward the inner ends 4 thereof at the sides of the casing. The front walls 5 of the surfaces 1 are approximately radial to the body of the tire casing and are abrupt, as shown in Figs. 1 and 5. The radial width of the walls 5 is tapering from maximum width at the periphery of the tire casing to a minimum or merger with the surface of the tire casing at or near the beads 3, and extend in angular or curved directions relative to the radii of the axis 2.

By this construction, the circumferential width of the surfaces 1 at the periphery of the tire casing exceeds the width of said surface at any other point along its length; and the radial width of each wall 5 is greater at or near the periphery of the tire casing than at any other point.

Assuming that the tire is rotating to travel in the direction of the arrow 6a (Fig. 2), the walls 5 below the horizontal plane 6 of the axis 2 constitute impingement surfaces or walls for the air stream represented by the arrows 7 resulting from the travel of the airplane in power or gliding landing.

At the periphery of the wheel, the surfaces 1 are relatively wide and are defined by the abrupt front walls 5 and by walls 8 inclining from the outer periphery of each surface 1 to intersection with the adjacent rear wall 5. This provides at the front portion of the rotating wheel forwardly inclined walls 8 which are not substantially obstructed by the air stream or forward movement of the plane through the air. This leaves the tire and the wheel on which it is mounted freely rotative by impingement of the air stream 7 against the walls 5 at the lower front portion of the wheel. Thus, when the landing gear is extended preparatory for landing, rotation of the wheels is initiated by impingement of the air streams 7 against the walls 5 at the lower front portion of the wheel, and such rotation is maintained approaching the speed of travel of the airplane when the surfaces 1 contact or engage the surface of the landing field.

While the surfaces 1 are shown as extending angularly along curved lines from the periphery of the casing toward the beads 3, it should be understood that this arrangement may be varied as desired and the surfaces 1 may be extended along other than curved lines. This is optional. Also, the surfaces 1 are connected by a circumferential tread or bearing rib 9 having its circumferential surface in the same annular plane with the surfaces 1 around the axis 2 of the tire casing.

A tire constructed in accordance with this invention attains all of its intended objects and purposes with a high degree of efficiency, and considerably extends or prolongs the period of use or life of the tire. Tires of this type function as supporting bearings for the plane traveling upon the surface of the landing field or ground, and also provide traction surfaces for braking power to reduce the momentum of the plane while taxiing after a landing. The entire invention is embodied in the tire proper and does not include or consist of accessories or attachments protruding beyond the sides of the usual tire casing. The construction and arrangement may be varied within the scope of equivalent limits without departure from the nature and principle thereof.

I claim:

1. An airplane tire having an axis of rotation and comprising a tubular body open along its inner periphery and having an annular axis, a series of circumferentially spaced abrupt walls having portions near the outer periphery of said casing extending a substantial distance inwardly and radially toward said annular axis, each of said walls being of increasing width from near the inner periphery of said body at each side toward said outer periphery and curving longitudinally toward the opposite side of said body and being located successively in series toward the front and below the plane of the horizontal diameter of the tire during rotation of said tire, said walls receiving air pressure to initiate and maintain rotation of the wheel on which said tire is mounted around said axis of rotation while said wheel is in position for landing of the airplane, said rotation being around said axis of rotation in the direction and at a speed approximating the speed of rotation of said wheel after said landing, circumferential bearing surfaces of increasing width from the ends of said abrupt walls toward the outer periphery of said casing and extending from one toward the next adjacent one of said pair of said walls, and rear walls inclining in planes inwardly from intersection with each of said surfaces to intersection with the inner edge of the next adjacent abrupt wall and preventing the formation of partial vacuums along said abrupt walls when said abrupt walls are above said horizontal diameter during rotation of said tire as aforesaid.

2. An airplane tire having an axis of rotation and comprising a tubular body open along its inner periphery and having an annular axis, a series of circumferentially spaced abrupt walls having portions near the outer periphery of said casing extending a substantial distance inwardly and radially toward said annular axis, each of said walls being of increasing width from near the inner periphery of said body at each side toward said outer periphery and curving longitudinally toward the opposite side of said body and being located successively in series toward the front and below the plane of the horizontal diameter of the tire during rotation of said tire, said walls receiving air pressure to initiate and maintain rotation of the wheel on which said tire is mounted around said axis of rotation while said wheel is in position for landing of the airplane, said rotation being around said axis of rotation in the direction and at a speed approximating the speed of rotation of said wheel after said landing, circumferential bearing surfaces of increasing width from the ends of said abrupt walls toward the outer periphery of said casing and extending from one toward the next adjacent one of said pair of said walls, rear walls inclining in planes inwardly from intersection with each of said surfaces to intersection with the inner edge of the next adjacent abrupt wall and preventing the formation of partial vacuums along said abrupt walls when said abrupt walls are above said horizontal diameter during rotation of said tire as aforesaid, and a continuous circumferential bearing rib integrally connecting said circumferential surfaces and having its circumferential surface continuously in the same annular plane therewith.

3. A casing for an airplane tire comprising a tubular body open along its inner periphery and having an annular axis and also having an axis of rotation, a series of relatively wide surfaces extending on both sides from the outer to the inner periphery of said casing whereby said surfaces extend from and form part of the tread of the tire and extend across both side walls thereof, the leading side edge of each surface being concavely curved and the trailing edge of each surface being convexly curved and merging with the concave edge of the adjacent convex surface to prevent the formation of a vacuum, and each leading edge having an abrupt wall constituting a vane for relatively high air pressure to initiate and maintain rotation of said tire when mounted in position for landing of an airplane mounting said tire.

4. A casing for an airplane tire comprising a tubular body open along its inner periphery and having an annular axis and also having an axis of rotation, a series of relatively wide surfaces extending on both sides from the outer to the inner periphery of said casing whereby said surfaces extend from and form part of the tread of the tire and extend across both side walls thereof, the leading side edge of each surface being concavely curved and the trailing edge of each surface being convexly curved and merging with the concave edge of the adjacent convex surface to prevent the formation of a vacuum, and a continuous circumferential bearing rib located on the outer periphery of said casing integrally connecting said relatively wide surfaces.

RUSSELL J. SMITH.